FIG.I.
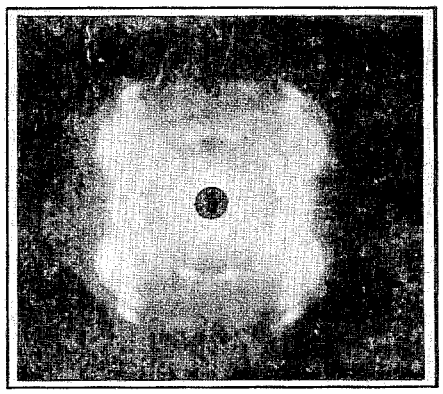
FIG.2.
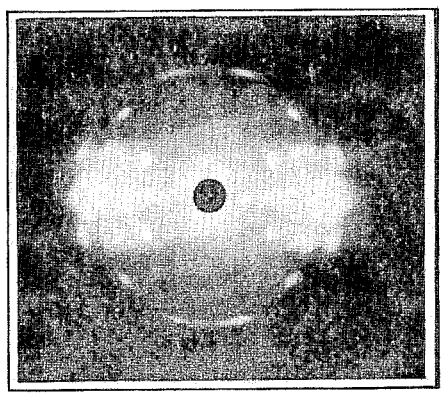
INVENTORS.
GLENN A. NESTY
LEO J. SPILLANE
BY
ATTORNEY.

3,228,913
POLYESTERS OF 4,4'-DICARBOXYDIPHENYLSULFONE WITH GLYCOLS AND FIBERS THEREOF
Glenn A. Nesty, Morristown, N.J., and Leo J. Spillane, El Dorado, Ark., assignors to Allied Chemical Corporation, a corporation of New York
Filed Apr. 20, 1953, Ser. No. 349,888
31 Claims. (Cl. 260—75)

This invention is directed to the polymeric esters having high molecular weights of 4,4'-dicarboxydiphenylsulfone with glycols having two hydroxy groups on the terminal carbon atoms of a straight chain composed of at least five carbon atoms, or polymeric mixed enters of 4,4'-dicarboxydiphenylsulfone with a mixture of those glycols or a mixture of one or more of those glycols with diethylene glycol (a glycol ether) or with a saturated aliphatic glycol having a straight carbon chain of less than five carbon atoms, with the two hydroxyl groups on terminal carbon atoms of the chain, in which mixture at least 50 mol percent consists of the saturated aliphatic glycol having at least five carbon atoms in the chain. This invention is especially directed to molecularly oriented fibers of these polymeric esters.

It is known to form glycol esters of aryl dicarboxylic acids, such as terephthalic acid, which may be heated to polymerize them and form resins. Such a polymerized polyglycol ester of terephthalic acid has recently been commercialized as "Terylene" in the form of fibers.

We have discovered certain glycol esters of 4,4'-dicarboxydiphenylsulfone form polymers having substantially higher melting points than those of like chain lengths prepared from the esters of terephthalic acid. These new polymers of high molecular weight (as measured by their intrinsic viscosity) are molecularly oriented when stretched at temperatures substantially below their melting point. The high melting points of these polymeric esters make them particularly suitable as a material out of which fibers are spun. Our novel polymers can also be used for the production of films and cast articles in which the polymer material may or may not be oriented, depending upon the procedure used in making these articles.

The dicarboxylic acid 4,4' - dicarboxydiphenylsulfone may be prepared by heating toluene with concentrated sulfuric acid or one of its halogenated derivatives, such as chlorosulfuric acid, and oxidizing with dilute permanganate solution or a solution of chromic acid in acetic acid the resulting 4,4'-dimethyldiphenylsulfone to 4,4'-dicarboxydiphenylsulfone. This sulfone acid may be esterified by reaction with a lower aliphatic alcohol, such as methanol or ethanol, and the ester of the lower alcohol transesterified by reaction with a glycol or glycol ether to form the corresponding glycol or glycol ether ester of 4,4'-dicarboxydiphenylsulfone. Also, these glycol esters may be prepared by direct esterification of 4,4'-dicarboxydiphenylsulfone by reaction with a glycol or glycol ether.

We have discovered that the esters of 4,4'-discarboxydiphenylsulfone with saturated aliphatic glycols having two hydroxy groups on the terminal carbon atoms of a straight chain of at least five carbon atoms may be heated to polymerize the glycol esters until the resulting polymeric esters have intrinsic viscosities of at least 0.4 at 25° C. Linear polymers are thus formed which are molecularly oriented by cold drawing and have properties making them particularly suitable for spinning into fibers. These polyesters have high melting points, which nevertheless lie below the decomposition temperatures of the polyesters, so they are adaptable to being readily spun into fibers by a melt-spinning process. Fibers spun from the polyesters and cold drawn to molecularly orient them have relatively high melting points compared to many fibers heretofore produced from synthetic polymers, satisfactory strengths (tenacities) and stretchability up to the breaking point (ultimate elongation) and are dyeable by acetate dyes; all of which properties are important in making it practicable to produce synthetic fibers of these polyesters.

We have found that in making the polyester compositions of our invention a part of the higher, five carbon atom glycol reacted to form the esters of 4,4'-dicarboxydiphenylsulfone may be substituted by diethylene glycol or a saturated aliphatic glycol containing less than five carbon atoms in the chain without seriously impairing the characteristics of the high molecular weight polyesters which make them peculiarly suitable for fiber production. In some cases, the polyester characteristics may be advantageously modified or their production cheapened in this manner. However, at least 50 mol percent of the glycol or glycol and glycol ether mixture used in preparing the polyesters is composed of the saturated aliphatic glycols of higher molecular weight, i.e., those containing at least five carbon atoms.

We have found that the glycol esters of 4,4'-dicarboxydiphenylsulfone produced by a particular method involving transesterification and a two-stage polymerization treatment, in the second of which stages a partially polymerized ester is heated in finely divided solid condition, produces polymers of high intrinsic viscosity which are especially suitable for spinning into fibers and stretching the fibers to molecularly orient them.

In this procedure an alcohol diester of 4,4'-dicarboxydiphenylsulfone, preferably a diester of a low boiling, saturated, aliphatic monohydroxy alcohol, such as the dimethyl or diethyl ester, is mixed with one or more saturated aliphatic glycols containing at least five carbon atoms or with a mixture of such gycols and a glycol or glycol ether containing less than five carbon atoms in the molecules, in which mixture the higher glycol (five or more carbon atoms in the molecules) constitutes at least 50 mol percent of the total glycol and glycol ether present. The mixture contains a ratio of at least 1.3 mols of total glycol and glycol ether for every one mol of the diester of the sulfone acid. It is better to use a higher ratio, preferably more than 2 mols of total glycol and glycol ether for every one mol of the diester. Using the higher ratios, the molecular weights of the polymers prepared from the resulting glycol or mixed glycol-glycol ether esters of the sulfone acid are increased and better fibers are produced therefrom. The alcohol of the diester is one which boils at a temperature below the boiling point of the glycol and glycol ether employed for transesterification of the diester. Aliphatic, cycloaliphatic or aromatic alcohols may be employed for this transesterification so long as the boiling point of the alcohol bears the above relationship to the boiling point of the glycol and glycol ether to be converted into the desired ester. A transesterification catalyst also is incorporated in the reaction mixture. Numerous catalysts for transesterification of esters are known and they may be used in carrying out the foregoing step of our process. Preferred catalysts are salts of zinc and particularly the silicofluoride, fluoride, fluoroborate, cyanide, acetate, or borate of zinc. Magnesium carbonate is a good catalyst for this transesterification.

The reaction mixture of diester, glycol or glycol and glycol ether and catalyst is heated in an oxygen-free atmosphere at temperatures at which alcohol displaced from its ester by the glycol or glycol ether, is vaporized and is distilled from the reaction mixture. When this alcohol ceases to distill over the ester interchange and formation of the desired glycol or mixed glycol-glycol ether ester of the dicarboxydiphenylsulfone has been substantially completed.

The particular composition of the glycol or glycol-glycol ether esters formed will depend upon the amount of glycol and glycol ether mixed with the diester. With more than 2 mols total glycol and glycol ether added per mol of the alcohol ester the product is essentially diglycol or mixed diesters of the sulfone acid with two or more glycols or glycols and glycol ether. As less total glycol and glycol ether is used, the product contains more of the mixed esters of glycol or of glycol and glycol ether and alcohol. Thus, with the 1.3 mols glycol or glycol and glycol ether per mol of the alcohol ester of the sulfone acid, the transesterification product is largely the monoglycol ester or glycol-glycol ether mono-ester. By employing a mixture of two or more different glycols, mixed glycol esters of the sulfone acid are produced.

While we have described above our preferred method for making the glycol esters, they may be prepared in other manners. For example, the 4,4'-dicarboxydiphenylsulfone may be directly esterified by heating the acid with the saturated aliphatic glycols or glycols and glycol ether. This esterification is promoted by having present in the reaction mixture an esterification catalyst, of which many are well known to the art.

The preferred esters for use in preparing polymers by the methods described below are prepared from glycols containing 5 to 10 carbon atoms in the molecule, with or without ethylene glycol or diethylene glycol also present in limited proportions.

When heated, the above-described glycol esters polymerize to form the polymers of our invention with evolution of glycol or of glycol and glycol ether or a lower boiling alcohol. The mixed alcohol-glycol or alcohol-glycol-ether esters polymerize when heated to form essentially the same polymers as are formed by heating the diesters of the glycols or glycol-ether. These polymeric esters of our invention are characterized by containing recurring chain units having the structure.

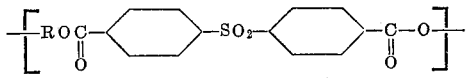

where R represents the divalent radicals —$(CH_2)_n$— and —$(CH_2)_2O(CH_2)_2$, where $n$ is an integer greater than one which may have different numerical values in different chain units in a given polymer; and in any given polymer at least 50% of the radicals R consist of $(CH_2)_n$ in which the value of $n$ is at least 5, preferably 5 to 10. When mixtures of higher and lower glycols or diethylene glycol and alkyl esters of 4,4'-dicarboxydiphenylsulfone are heated and the mixed esters formed are further heated to form our polymeric esters, the resulting polymers will have this composition when the higher (at least five carbon atom) glycol constitutes at least 50 mol percent of the mixture.

In our preferred polymers, one end valence of the polymer chain is satisfied by a hydroxyl group attached to the R radical and the other by a —$(CH_2)_nOH$ or —$(CH_2)_2O(CH_2)_2OH$ group. On the other hand, one or both the end valences of the polymer chain may be satisfied by a chain terminating aliphatic, cycloaliphatic or aromatic radical, such as the methyl, cyclohexyl or benzyl radicals.

We have found particularly useful the polymeric diesters and the polymeric mixed diesters of 4,4-dicarboxydiphenylsulfone with one or a plurality of the glycols of the homologous series ethylene glycol through and including decamethylene glycol.

Our polymers of high molecular weight are characterized by being thermoplastic and microcrystalline in structure, and when stretched at temperatures substantially below their melting temperatures become oriented. The accompanying drawing shows in FIG. 1 the X-ray diffraction pattern produced by oriented polymers of our invention as typified by a ploymeric hexamethylene glycol ester of 4,4'-dicarboxydiphenylsulfone. FIG. 2 of the drawing shows the X-ray diffraction pattern given by a stretched fiber of a polymeric ester of ethylene glycol and terephthalic acid, a fiber-forming polymer of the type known as "Terylene" and "Fiber V." The concentration of the diffraction spots in the form of equatorial arcs shown in FIG. 2 is not only characteristic of the polyesters of ethylene glycol and terephthalic acid but also of most of the thermoplastic, fiber-forming, linear polymers such as the polyamides, polyacrylonitrile, regenerated cellulose, cellulose acetate, etc. This diffraction pattern shows a parallelism of the crystallite axis and the fiber axis. The concentration of diffraction spots in each quadrant shown in FIG. 1 indicates a different placing of the crystallite axis with respect to the fiber axis for our sulfone polymers. We now interpret this X-ray pattern of our polymers as indicating the crystallite axis is at a substantial angle (possibly as much as a 45° angle) to the fiber axis.

In preparing the polymers of the above described glycol esters of 4,4'-dicarboxydiphenylsulfone, the reaction product of the transesterification is advantageously used directly, without purification, although the same procedure may be employed for polymerization of the purified esters. In our preferred procedure the reaction product of the transesterification step described above is further heated under reduced pressure below atmospheric to cause partial polymerization of the dicarboxydiphenylsulfone ester. This heating is best carried out under reduced pressure of the order of 1 mm. Hg and is at temperatures at which glycol or glycol and glycol ether or lower aliphatic alcohol is vaporized from a melt of the reaction mixture. The vaporization and removal of glycol, glycol ether and lower aliphatic alcohol is promoted by passing an inert, dry, oxygen-free gas, e.g. nitrogen, through the molten reaction mixture. The heating of the molten mixture preferably is continued for about two to about four hours or (alternatively) until the intrinsic viscosity of the partially polymerized glycol ester is of the order of 0.2. In this application all intrinsic viscosities given are the values calculated from the viscosities of an 0.5–1% solution of the ester polymer dissolved in a solvent consisting of a 60/40 mixture by weight of phenol and s-tetrachloroethane and of the solvent itself, the viscosities of solution and solvent being measured at 25° C. The following equation is employed for these calculations:

$$Ni = \frac{\log_e nr}{C}$$

where:

$nr$ is the viscosity of the polymer solution divided by the viscosity of the solvent and, C is the concentration in grams per 100 cc. of the polymer solution.

At the end of the foregoing first stage of polymerizing the glycol ester by heating it in a molten state, the reaction mixture containing the partially polymerized ester is converted into small solid particles. Preferably, it is cooled to solidify it and the solid is finely ground. The solid particles are then heated in a second polymerization stage to temperatures below their melting point under reduced pressures and in an atmosphere of nitrogen or other inert, dry, oxygen-free gas. This heating of the solid polymer is preferably carried out at temperatures of about 30° to about 50° C. below the melting point of the partially polymerized material being heated, and under reduced pressures of the order of 0.001 mm. Hg. By heating this solid the ester is further polymerized to form a product of higher molecular weight and higher intrinsic viscosity. As the heating of the solid is prolonged, the intrinsic viscosity increases up to a maximum. Further heating is not desirable, since it may lead to a decomposition of the polymer and decrease in intrinsic viscosity. For production of fibers, the solid is heated until the intrinsic viscosity of the polymer is increased to about 0.4 or higher, preferably to 0.9 or higher.

The highly polymerized glycol esters of 4,4'-dicarboxydiphenylsulfone produced by the particular two-stage polymerization procedure just described may be spun from a molten mass of the polymer or from a solution of the polymer in a solvent. We preferably employ a melt-spinning procedure in which the molten polymer is spun through a spinneret in the form of a number of fine filaments which are cooled and stretched several times their original length to orient the polymer structure of the fibers and improve their properties. The stretching procedure may be carried out either at room temperature or at somewhat elevated temperatures above room temperature. In some cases after the fibers have been spun, if they are allowed to stand at room temperature for a prolonged period a change in character of the fibers takes place which makes their stretching difficult or impossible. In such case, the fibers should be stretched promptly after production and before such change occurs by prolonged standing. After stretching, the oriented fibers are stable.

Our invention will be more particularly described and illustrated by the following specific examples:

*Example 1.*—A mixture of 4,4'-dicarbmethoxydiphenylsulfone, 3 mols of hexamethylene glycol for every 1 mol of the sulfone ester, and 0.187% zinc silicofluoride (percent based on weight of sulfone ester) was heated in a distillation apparatus under a stream of dry, oxygen-free nitrogen for five hours at 200°–205° C. and under 750 mm. Hg pressure. During this heating the reaction mixture was a molten mass from which methanol was evolved with formation of the hexamethylene glycol ester of the diphenylsulfone acid. The reaction temperature was then raised to 275° C., the pressure slowly reduced to 1.0 mm. Hg, and heating was continued for three hours while a stream of nitrogen gas passed through the melt. At this higher temperature and lower pressure, polymerization occurred with evolution of hexamethylene glycol. Upon cooling, the thus partially polymerized ester solidified. It was ground to approximately a 20 mesh particle size and heated for 24 hours at 235°–240° C. under a pressure of 0.0003 mm. Hg to further polymerize it with evolution of hexamethylene glycol, forming a high molecular weight, polymeric hexamethylene glycol ester of 4,4'-dicarboxydiphenylsulfone. The material thus heated remained in the solid state. The product obtained was a white, opaque, crystalline polymer having a softening point of 268°–274° C. Its intrinsic viscosity was found to be 0.65.

Under a blanket of dry carbon dioxide, the solid polymer was placed in a heated (295° C.), cylindrical, stainless steel vessel, and then forced through five openings (0.0145 inch in diameter) by means of a motor-driven steel piston. The extruded filaments were passed through an atmosphere of cool, dry nitrogen and wound on a roll. The filaments were stretched about 425% while passing through a short heater, heated to 115° C. The 57.2 denier yarn thus produced gave an elongation at break of 17% and a tenacity of 3.4 grams per denier. The fibers were then further treated by passing them through a short heater, heated to 195° C., while operating both feed rolls and take-up rolls at equal rates. The resulting 52.6 denier yarn had a silk-like appearance, an elongation at break of 16% and a tenacity of 3.8 grams per denier.

X-ray diffraction patterns taken on the unstretched fiber samples were typical of fibers of an unoriented, amorphous structure. The stretched fiber samples, on the other hand, revealed the very sharp and distinctive X-ray diffraction pattern, described above and illustrated in FIG. 1 of the accompanying drawing, indicating crystallinity and molecular orientation.

*Example 2.*—A mixture of 4,4'-dicarbmethoxydiphenylsulfone and 3 mols of hexamethylene glycol for every 1 mol of the methyl ester of the carboxysulfone, with 0.19% by weight added zinc borate was prepared and heated in a distillation apparatus under a stream of dry, oxygen-free nitrogen at 200°–220° C. under 750 mm. Hg pressure (absolute). At the end of 1½ hours most of the methanol originally combined in the carboxysulfone methyl ester was removed and the ester interchange substantially completed. During this time the reaction mixture was a molten mass. The heating of the molten mass was then continued at 270°–280° C. under a reduced pressure of 1 mm. Hg for three hours, a small flow of nitrogen being maintained through the melt. At the end of this period the product was cooled to solidify it. It was a microcrystalline polymer which, when melt spun into filaments and cold drawn (stretched at room temperatures), produced weak fibers.

The partially polymerized glycol diester of the dicarboxydiphenylsulfone thus produced was finely ground and the solid further heated under a pressure of 0.003 mm. Hg for ten hours at 235°–242° C (i.e., about 40° C. below the melting point of the material). The product obtained at the end of this heating period was a white, opaque crystalline polymer having a melting point of 276°–279° C. Its intrinsic viscosity was found to be 0.69.

A melt of the polymer thus produced was extruded through a spinneret into an atmosphere of carbon dioxide and the fibers thus formed were drawn at 20°–25° C. to stretch them 330%. The fibers thus produced had a silky appearance, a molecularly oriented structure and a tensile strength of 1.57 g./d.

*Example 3.*—A mixture of 4,4'-dicarbmethoxydiphenylsulfone, 3 mols of hexamethylene glycol for every 1 mol of the sulfone ester, and 0.2% by weight of zinc fluoride was heated in a distillation apparatus under a stream of dry, oxygen-free nitrogen for three hours at 200°–210° C., and under 750 mm. Hg pressure. This treatment removed most of the methanol of the methoxysulfone ester and the ester was substantially completely converted by ester interchange into the dihexamethylene glycol ester of 4,4'-dicarboxydiphenylsulfone in the heated molten reaction mixture.

The melt containing the glycol ester was then further heated at 275° C. under a pressure of 1 mm. Hg for three hours with a slow stream of the nitrogen gas passing through the melt. At the end of this heating stage the partially polymerized glycol ester was a crystalline polymer which yielded weak fibers which could be cold drawn to molecularly orient them.

The molten mass containing the partially polymerized ester was cooled to solidify it and the solid finely ground. This ground solid was then heated for 17 hours at 240° C. under a pressure of 0.0003 mm. Hg. The material thus heated at a temperature of about 35° C. below its melting point, remained in the solid state. The product thus obtained was a white, opaque, crystalline polymer having a melting point of 272°–278° C. Its intrinsic viscosity was found to be 0.95.

A melt of this highly polymerized ester of hexamethylene glycol and 4,4'-dicarboxydiphenylsulfone extruded at about 285°–300° C. into a carbon dioxide atmosphere, forms fibers which can be drawn at 20°–70° C. to stretch them 300–600%. The resulting fibers have a silk-like appearance, an oriented structure and a tensile strength of about 2 g./d.

*Example 4.*—A reaction mixture of 4,4'-dicarbethoxydiphenylsulfone, about 3 mols of hexamethylene glycol for every 1 mol of the sulfone ester, and 0.19% by weight zinc silicofluoride as transesterification catalyst, was heated at 200° C. for about two hours. During this period the ethyl alcohol formed was distilled out of the reaction mixture. The temperature was then raised to 275° C. and the melt maintained at that temperature for about three hours to cause partial condensation of the hexamethylene ester of the sulfone and evolution of hexamethylene glycol; the pressure being maintained at about 1 mm. Hg absolute.

During both of the foregoing two heating steps first to form the hexamethylene ester by transesterification and then to partially polymerize that ester, a nitrogen atmosphere was maintained in the reaction vessel with a slow stream of nitrogen being passed therethrough to facilitate evolution first of ethyl alcohol and then of hexamethylene glycol.

The molten reaction mixture thus produced was cooled to solidify it and the solid was finely ground. The fine powder was then heated under 0.0003 mm. Hg pressure at 240° C. for a period of 15 hours. At this temperature, about 30° C. below the melting point of the solid being heated, further condensation took place with evolution of hexamethylene glycol and formation of a highly polymerized resin having a melting point of 265°–270° C. and an intrinsic viscosity of 0.97.

Employing essentially the same procedure of this example, except for using zinc borate instead of zinc silicofluoride as the catalyst, the following glycols were reacted with 4,4'-dicarbethoxydiphenylsulfone to form the corresponding glycol esters and those esters then polymerized in two stages to form polymers of the indicated melting points and intrinsic viscosities:

| Glycol Used | Properties of the Resulting Polymer | |
|---|---|---|
| | Melting Point, °C. | Intrinsic Viscosity |
| Decamethylene glycol | 226–230 | 0.46 |
| Pentamethylene glycol | 285–288 | 0.61 |
| Mixtures of Glycols in equal mol proportions: | | |
| Ethylene and hexamethylene glycols | 252–255 | 0.44 |
| Ethylene and decamethylene glycols | 222–227 | 0.55 |

All of the highly polymerized esters produced in accordance with the procedure of this example may be melt spun into fibers or filaments and these stretched to molecularly orient them.

*Example 5.*—A mixture of 4,4'-dicarbmethoxydiphenylsulfone and hexamethylene glycol in the mol ratio of 1:1.3, with 0.2% zinc silicofluoride added, it heated in a distillation apparatus under a stream of dry, oxygen-free nitrogen for 2¼ hours at 200° C. under 750 mm. Hg pressure. About 1 mol methanol for every 1 mol of the dicarbmethoxydiphenylsulfone is vaporized from the reaction mixture to form a product largely composed of the monohexamethylene glycol-monomethyl mixed ester of the dicarboxydiphenylsulfone. The mixed glycol-alkyl ester is then heated at 275° C. under 1 mm. Hg pressure for 2½ hours with a small flow of nitrogen being maintained through the melt. During the initial portion of this heating the transesterification reaction between the dicarbmethoxydiphenylsulfone and hexamethylene glycol was carried to substantial completion, resulting in a material essentially composed of the monohexamethylene glycol-monomethyl mixed ester of dicarboxydiphenylsulfone together with some dihexamethylene glycol ester of dicarboxydiphenylsulfone. As the heating was prolonged, these esters were polymerized with elimination of methanol.

The resulting microcrystalline polymer of relatively low molecular weight is cooled and solidified and the solid finely ground. The finely ground material is then further heated for 17 hours at 240° C. under a reduced pressure of 0.003 mm. Hg. The material remains in the solid state during this heating. The resulting crystalline polymer is suitable for melt spinning into fibers which are cold drawn to orient them.

In producing polymeric hexamethylene glycol ester of 4,4'-dicarboxydiphenylsulfone by the procedure of this example, a white, opaque, crystalline polymer free of decomposed matter was obtained. It had a melting point of 262–270° C. and its intrinsic viscosity was 0.66. Melt spun into fibers, the fibers were easily cold drawn to orient them.

*Example 6.*—A mixture of 4,4'-dicarbmethoxydiphenylsulfone, hexamethylene glycol and ethylene glycol in the mol ratios of 1:1.5:1.5, with about 0.1% by weight zinc borate added, is heated at 190°–205° C. under atmospheric pressure for one to two hours. Methanol is evolved. The heating is then continued for 2½ to 3 hours at 265°–275° C. under a reduced pressure of 1 mm. Hg. The white, opaque solid obtained by cooling material formed in this manner, is finely ground and the solid heated at 230°–240° C. for 31 hours under a reduced pressure of 0.003 to 0.0003 mm. Hg. Before this final step of heating the finely ground solid, the material had an intrinsic viscosity of 0.33. After 5 hours heating of the solid the product had a substantially higher intrinsic viscosity of 0.57, which showed little change at the end of the 31 hours of heating. Intrinsic viscosity of the final products prepared in this manner were 0.53 and 0.59.

Mixed polymers of ethylene and hexamethylene glycol with 4,4'-dicarboxydiphenylsulfone from several batches prepared in this manner, were mixed and spun into fibers at 285° C. by a melt spinning process. The spun fibers were cold drawn to stretch them 580% and molecularly orient them. The drawn fibers were then relaxed at 75° C. Fibers thus obtained had an ultimate elongation of 22%, and a tensile strength of 2.3 g./d.

This application is in part a continuation of our co-pending application Serial No. 280,112, filed April 2, 1952, now abandoned.

We claim:

1. The fiber forming polymeric esters of 4,4'-dicarboxydiphenylsulfone with dihydroxy compounds from the group consisting of the saturated aliphatic glycols having the two hydroxy groups on the terminal carbon atoms of a straight carbon chain and diethylene glycol, at least 50 mol percent of said dihydroxy compounds consisting of glycols having at least five carbon atoms in the chain, said polymeric esters having an intrinsic viscosity of at least 0.4 at 25° C., a microcrystalline structure and when stretched at temperatures substantally below their melting point becoming molecularly oriented.

2. The fiber forming polymeric esters of 4,4'-dicarboxydiphenylsulfone with saturated aliphatic glycols having the two hydroxy groups on the terminal carbon atoms of a straight carbon chain, at least 50 mol percent of said glycols consisting of glycols of the homologous series pentamethylene glycol through and including decamethylene glycol, said polymeric esters having an intrinsic viscosity of at least 0.4 at 25° C., a microcrystalline structure and when stretched at temperatures substantially below their melting point becoming molecularly oriented.

3. The fiber forming polymeric esters of 4,4'-dicarboxylicdiphenylsulfone with the saturated aliphatic glycols having two hydroxyl groups on the terminal carbon atoms of a straight chain of at least five carbon atoms, said polymeric esters having an intrinsic viscosity of at least 0.4 at 25° C., a microcrystalline structure and when stretched at temperatures substantially below their melting point becoming molecularly oriented.

4. The fiber forming polymeric esters of 4,4'-dicarboxydiphenylsulfone with the saturated aliphatic glycols of the homologous series pentamethylene glycol through and including decamethylene glycol, said polymeric esters having an intrinsic viscosity of at least 0.4 at 25° C., a microcrystalline structure and when stretched at temperatures substantially below their melting point becoming molecularly oriented.

5. The fiber forming polymeric esters of 4,4'-dicarboxydiphenylsulfone with hexamethylene glycol, said polymeric esters having an intrinsic viscosity of at least 0.4 at 25° C., a microcrystalline structure and when stretched at temperatures substantially below their melting point becoming molecularly oriented.

6. The fiber forming polymeric mixed esters of 4,4'-dicarboxydiphenylsulfone with hexamethylene glycol and ethylene glycol, at least 50 mol percent of said glycol being the hexamethylene glycol, said polymeric esters having an intrinsic viscosity of at least 0.4 at 25° C., a microcrystalline structure and when stretched at temperatures substantially below their melting point becoming molecularly oriented.

7. The fiber forming polymeric mixed esters of 4,4'-dicarboxydiphenylsulfone with hexamethylene glycol and diethylene glycol, at least 50 mol percent of said glycol being the hexamethylene glycol, said polymeric esters having an intrinsic viscosity of at least 0.4 at 25° C., a microcrystalline structure and when stretched at temperatures substantially below their melting point becoming molecularly oriented.

8. Molecularly oriented fibers of the polymeric esters of claim 1.

9. Molecularly oriented fibers of the polymeric esters of claim 2.

10. Molecularly oriented fibers of the polymeric esters of claim 3.

11. Molecularly oriented fibers of the polymeric esters of claim 4.

12. Molecularly oriented fibers of the polymeric esters of claim 5.

13. Molecularly oriented fibers of the polymeric esters of claim 6.

14. Molecularly oriented fiber sof the polymeric esters of claim 7.

15. A fiber forming polyester essentially composed of at least 50 mol percent of hexamethylene glycol ester of 4,4'-dicarboxydiphenylsulfone and no more than 50 mol percent of ethylene glycol ester of 4,4'-dicarboxydiphenylsulfone copolymerized therewith, said polyester having an intrinsic viscosity of at least 0.4 at 25° C., a crystalline structure and when stretched at temperatures substantially below its melting point becoming molecularly oriented.

16. The fiber forming polymeric esters of 4,4'-dicarboxydiphenylsulfone with hexamethylene glycol, said polymeric esters having an intrinsic viscosity in the range 0.6 to 1.0 at 25° C., a crystalline structure and when stretched at temperatures substantially below their melting point becoming molecularly oriented.

17. The fiber forming polymeric mixed esters of 4,4'-dicarboxydiphenylsulfone with hexamethylene glycol and ethylene glycol, at least 50 mol percent of said glycol being the hexamethylene glycol, said polymeric esters having an intrinsic viscosity in the range 0.4 to 0.6 at 25° C., a crystalline structure and when stretched at temperatures substantially below their melting point becoming molecularly oriented.

18. Molecularly oriented fibers of the polymeric esters of claim 15.

19. Molecularly oriented fibers of the polymeric esters of claim 16.

20. Molecularly oriented fibers of the polymeric esters of claim 17.

21. A linear highly polymeric polyester having a melting point of from about 225° C. to about 290° C. consisting of the following repeating units:

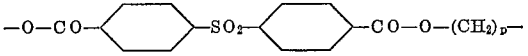

wherein $p$ represents a positive integer of from 5 to 10 and which is capable of being spun into fibers which can be cold drawn to from about 3 to 6 times their originally spun length, thereby developing strong elastic properties.

22. A linear highly polymeric polyester as defined in claim 21 wherein $p$ is 5.

23. A linear highly polymeric polyester as defined in claim 21 wherein $p$ is 6.

24. A linear highly polymeric polyester as defined in claim 21 wherein $p$ is 10.

25. A linear highly polymeric polyester having a melting point of from about 222° C. to about 255° C. consisting of a major proportion of the following repeating units:

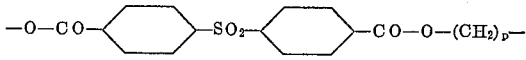

wherein $p$ represents a positive integer of from 5 to 10 and a minor proportion of the following repeating units:

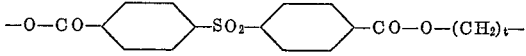

wherein $t$ represents a positive integer of from 2 to 4 and which is capable of being formed into fibers which can be cold drawn to from about 3 to 6 times their originally spun length, thereby developing strong elastic properties.

26. A linear highly polymeric polyester as defined in claim 25 wherein $p$ is 6 and $t$ is 2.

27. A linear highly polymeric polyester as defined in claim 25 wherein $p$ is 10 and $t$ is 2.

28. A linear highly polymeric polyester having a melting point of from about 225° C. to about 280° C. consisting of the following repeating units:

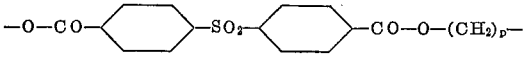

wherein $p$ represents a positive integer of from 5 to 10 and which is capable of being spun into fibers which can be cold drawn to from about 3 to 6 times their originally spun length, thereby developing strong elastic properties.

29. A linear highly polymeric polyester as defined in claim 28 wherein $p$ is 5.

30. A linear highly polymeric polyester as defined in claim 28 wherein $p$ is 6.

31. A linear highly polymeric polyester as defined in claim 28 wherein $p$ is 10.

References Cited by the Examiner
UNITED STATES PATENTS

| | | | |
|---|---|---|---|
| 2,465,319 | 3/1949 | Whinfield et al. | 260—75 |
| 2,547,113 | 4/1951 | Drewitt et al. | 260—75 |
| 2,614,120 | 10/1952 | Caldwell | 260—75 |
| 2,744,089 | 5/1956 | Caldwell | 260—75 |

FOREIGN PATENTS 621,977    4/1949    Great Britain.

OTHER REFERENCES

Textile World's Synthetic-Fiber Table of 1951.
Winfield: Endeavour, January 1952, pages 29–32.

W. H. SHORT, *Primary Examiner.*

W. G. BENGEL, M. STERMAN, P. E. MANGAN,
*Examiners.*